US005144335A

United States Patent [19]

Maslanka et al.

[11] Patent Number: 5,144,335

[45] Date of Patent: Sep. 1, 1992

[54] THERMAL PRINTER DONOR GUIDE ROLLER

[75] Inventors: Daniel C. Maslanka; Michael J. Ehmann, both of Rochester, N.Y.

[73] Assignee: Eastman Kodak Company, Rochester, N.Y.

[21] Appl. No.: 769,695

[22] Filed: Oct. 2, 1991

[51] Int. Cl.[5] ........................ B41J 2/325; B41J 17/28; B41J 17/30; G01D 15/00

[52] U.S. Cl. ............................... 346/76 PH; 400/248; 400/120

[58] Field of Search ................... 346/76 PH; 400/120, 400/248

[56] References Cited

U.S. PATENT DOCUMENTS 3,043,531 7/1962 Sinkewitsch ..................... 242/55.13
3,087,664 4/1963 Streeter ................................ 226/97
3,627,230 12/1971 Wangerin ........................... 242/210
4,507,667 3/1985 Tsuboi ............................ 346/76 PH
4,739,341 4/1988 Matsuno et al. ..................... 346/1.1
4,834,563 5/1989 Ozawa et al. ........................ 400/120
4,844,770 7/1989 Shiraishi et al. .................... 156/387
4,892,425 1/1990 Shimizu et al. ...................... 400/120
4,896,167 1/1990 Hayakawa ...................... 346/76 PH

FOREIGN PATENT DOCUMENTS 0268468 11/1986 Japan .................................. 400/248

*Primary Examiner*—Joseph W. Hartary
*Assistant Examiner*—Huan Tran
*Attorney, Agent, or Firm*—Raymond L. Owens

[57] ABSTRACT

A guide roller assembly is provided for a thermal printer to prevent the varying donor web tension from compromising the constant head load. The guide roller is mounted on a frame that is independent of the head loading assembly so that variations in web tension do not impact the head loading.

2 Claims, 1 Drawing Sheet

THERMAL PRINTER DONOR GUIDE ROLLER

FIELD OF INVENTION

This invention relates generally to thermal printers and, more particularly, relates to roller and guide assemblies for guiding the donor web in a color printer.

BACKGROUND OF THE INVENTION

A thermal printer creates colored prints by transferring dye contained in a donor web to a receiver as the receiver travels a path about a drum. The donor web is placed between the thermal print head and the receiver which is fixed to the drum. The thermal print head is loaded against the drum during the print cycle by a spring. Constant pressure is required to be maintained to insure the integrity and uniformity of the dye transfer process. As the donor advances during the print cycle, it normally contacts the front of the head and contributes a vertical force component which can compromise the constant head load. Accordingly, it will be appreciated that it would be highly desirable to have a donor web movement system which does not compromise the constant head load.

U.S. Pat. No. 4,834,563 which issued May 30, 1989 to Naohiro Ozawa, Toshihiko Gotoh and Junichi Shoji; U.S. Pat. No. 4,739,341 which issued Apr. 19, 1988 to Jyunichi Matsuano and Masaski Yoshida; and U.S. Pat. No. 4,507,667 which issued Mar. 26, 1985 to Kiyoshi Tsuboi disclose thermal printing apparatus wherein a roller assembly is attached to the print head and contacts the donor web after the donor emerges from the nip between the print head and the drum. The roller assembly keeps the donor web and receiver media together after emerging from the nip to help ensure uniform color transfer. In addition to helping ensure uniform color transfer, the roller assemblies also change the angle of the donor web as it emerges from the nip. This change of angle changes the path of the donor web somewhat as it exits the nip but has no effect on the donor entering the nip or as the ink transfer is taking place. Thus, these patents do not address the problem of uneven head loading and may contribute to the problem because the rollers that are attached to the head will effect the head load somewhat as the web tension varies. While these roller structures do help improve print quality or printer performance in a general sense, they have no effect on preventing the varying web tension of the donor from effecting the head load. Accordingly it will be appreciated that it would be highly desirable to have a simple structure for varying web tension without effecting the head load.

SUMMARY OF THE INVENTION

The present invention is directed to overcoming one or more of the problems set forth above. Briefly summarized, according to one aspect of the present invention, a thermal printer has a rotatable drum and a print head moveable toward and from the drum. A donor web passes between the drum and the print head. The printer has means for urging the donor web away from the print head and minimizing any vertical force component created when the donor web contacts the print head as the donor web passes over the drum.

A guide roller urges the donor web toward the drum and away from the print head to thereby minimize any vertical force component created when the web contacts the print head as the donor web passes over the drum. A guide roller frame supports the guide roller and is pivotally moveable independently of the print head to thereby prevent the varying web tension from compromising the constant head load.

It is an object of the present invention to prevent variations in donor web tension from compromising the constant head load. It is a feature of the invention that this objective is achieved by a donor web guide roller supported by a frame mounted independently of the head loading assembly. An advantage of the independent mounting of the frame and roller is minimization the vertical force created when the web contacts the front of the print head. Minimizing the vertical force contribution increases the constancy of the head load.

Another object of the present invention is to minimize the vertical force component created when the donor web contacts the front of the print head which compromises the constant head load. This object is achieved by a guide roller supported by frame mounted independently of the head loading assembly which alters the angle of contact of the donor web with the printer drum and print head thereby minimizing the vertical force component.

These and other aspects, objects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
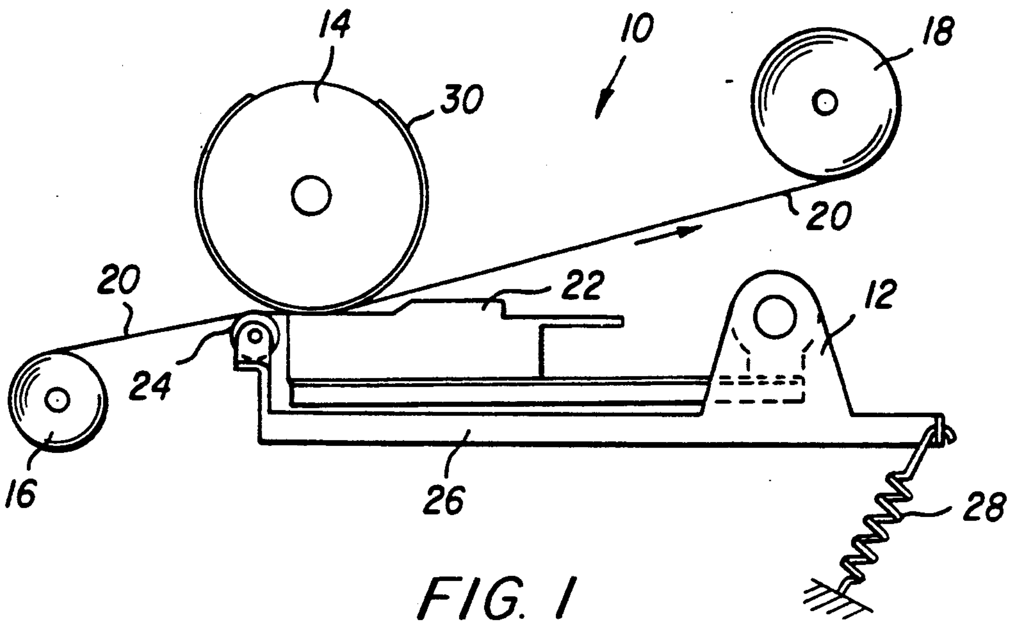
FIG. 1 is a diagrammatic view of a preferred embodiment of a thermal printer incorporating a donor guide roller in accordance with the present invention.
Figure 2:
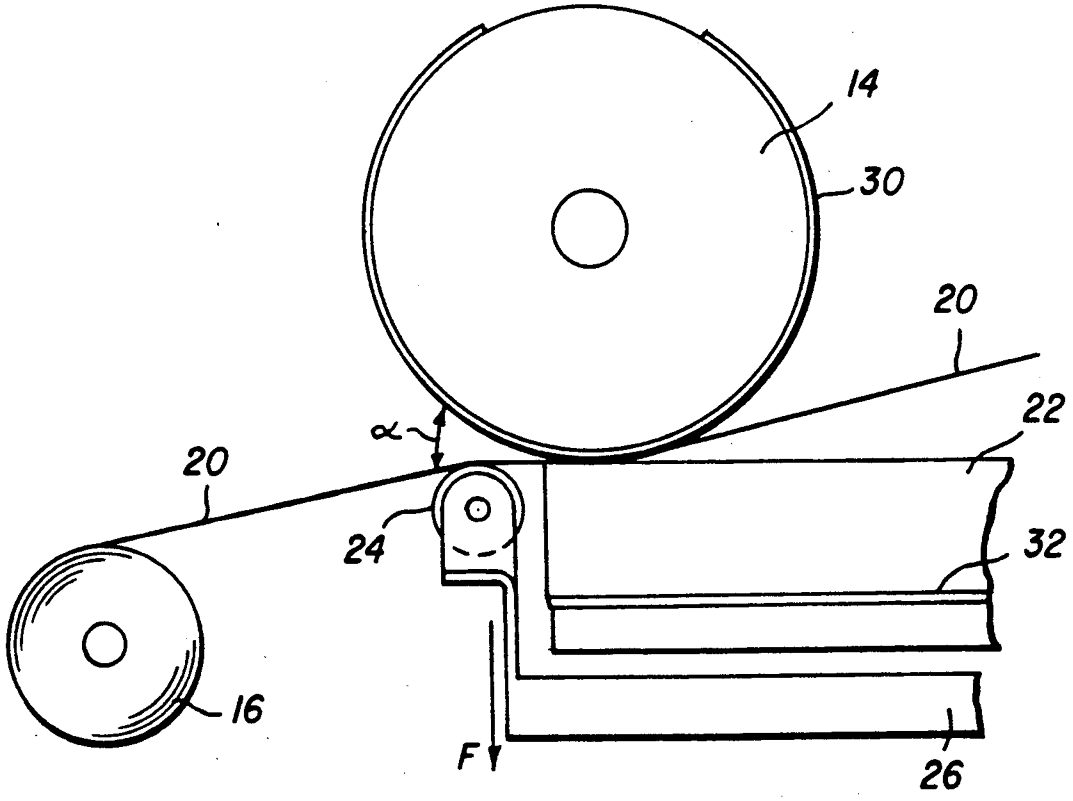
FIG. 2 is a diagrammatic view of a portion of the thermal printer of FIG. 1 illustrating the angle formed by the donor web and print drum.

Referring FIGS. 1 and 2, a thermal printer 10 has a frame 12 contained within a housing that contains a printer platen or drum 14, a donor web supply spool 16, a donor take-up spool 18 and a donor web 20 extending between the supply and take-up spools 16, 18. The printer also contains a thermal print head 22. The donor web 20 moves along the path from the supply spool 16 to the take-up spool 18. The path travelled by the donor web 20 passes over the rotatable drum 14 and in the vicinity of the thermal print head 22; so that, when the print head 22 is moved toward the drum 14 for printing, the donor web 22 lies between the thermal print head 22 and the drum 14. The drum 14 and thermal print head 22 are preferably mounted on the printer frame 12 with the thermal print head 22 being moveable toward and from the drum 14 to effect thermal printing on a receiver sheet 30 mounted on the drum 14.

The print drum 14 has a sheet of dye receiver media 30 attached about its circumference to receive dye from the dye donor 20. The print drum 14 rotates about a fixed point on the frame 12 but is fixed in space so that it does not alter the angle $\alpha$ that is formed by the donor web 20 and the print drum 14.

The print head 22 is preferably attached to a thermal print head bracket 32 that is pivotally connected to the frame 12 of the printer 10. As the print head bracket 32 pivots, the print head 22 moves toward and from the print drum 14. Both brackets 26 and 32 may pivot about the same pivot point, but the motions are completely independent of one another.

It is desirable to align the thermal print head 22 with the drum 14 so the donor web 20 passes through the nip formed between the drum 14 and thermal print head 22 during the print cycle. It is known that there must be some minimal and gentle contact between the donor web 20 and the drum 14 to provide a surface upon which the thermal print head 22 can act. Too much contact of the donor web 20 with the drum 14 is undesirable because it causes the donor web 20 to circumferentially travel the drum 14. Excessive friction is created when the web 20 circumferentially travels the drum 14 which can interfere with the printing process. The donor web 20 can form an angle $\alpha$ with the drum 14 or print head 22, whereby when the thermal print head 22 is positioned for printing, the angle $\alpha$ causes the donor web 20 to contact the thermal print head 22 creating a force, F, tending to move the thermal print head 22 from the drum 14.

Lifting of the thermal print head 22 from the drum 14 during printing by the donor web 20 is undesirable and is overcome in the present invention with a donor web guide roller 24 that urges the donor web 20 toward the drum 14 and away from the thermal print head 22. Controllably urging the donor web 20 toward the drum 14 minimizes any vertical force created when the donor web 20 contacts the thermal print head 22 as the donor web 20 passes over the drum 14. A vertical force is a force tending to urge the thermal print head 22 away from the drum 14.

The guide roller 24 is supported on a guide roller frame or bracket 26 that is pivotally connected to the frame 12 of the printer 10. The guide roller 24 rotates about a central axis and rollingly contacts the donor supply web 20. The guide roller frame 26 supports the guide roller 24 so that the guide roller 26 can position the donor web 20 for efficient printing. The donor roller frame 26 may be spring loaded by a spring 28 to help maintain uniform tension on the donor web 20. The spring 28 is preferably a coil spring with attaching means, such as hooks, on each end for engaging pins, flanges or openings in or on the bracket 26 and frame 12 to bias the guide roller 24 toward the print drum 14 and from the print head 22. The spring 28 tends to decrease the angle $\alpha$. The bracket 26 pivots about a fixed point on the frame to increase or decrease the angle $\alpha$.

Operation of the present invention is believed to be apparent from the foregoing description, but a few words will be added for emphasis. During a print cycle, the thermal print head 22 is loaded against the drum 14 by a spring or other means. Constant pressure is to be maintained to preserve the integrity of the dye transfer process. Normally, as the donor web 20 advances during the print cycle, the web 20 contacts the front of the thermal print head 22 and contributes a vertical force component, F, which compromises the constant head load; however, the donor roller frame 26 positions the roller 24 for contacting the donor web 20 and positioning the donor web 20 so that the angle $\alpha$ it forms with the print drum 14 produces a minimal vertical force component F.

When the vertical force component is minimal, variations in the web tensioning will not affect the loading of the thermal print head 22 relative to the drum 14. The head loading is not affected because the head 22 and the guide roller frame 26 are independently mounted and movable and do not interfere with one another. By independently movable it is meant that the roller 24 is free to move while attached to the moveable guide roller frame 26 without causing any movement of the head 22. On the other hand, loading of the head 22 has no bearing on the tensioning of the web 20 because the tensioning of the donor web 20 is adjusted by the roller 24 and guide roller arm 26.

It will now be appreciated that there has been presented a unique device to prevent the varying donor web tension from compromising the constant head load. This is accomplished by mounting a roller on a frame that is independent of the head loading assembly. One advantage of the independent mounting is minimizing the vertical force created when the web contacts the front of the print head. Minimizing the vertical force contribution increases the constancy of the head load. The present invention minimizes the vertical force component by altering the angle of contact of the donor web with the drum and print head.

While the invention has been described with particular reference to a preferred embodiment, it will be understood by those skilled in the art that various changes may be made and equivalents may be substituted for elements of the preferred embodiment without departing from invention. For example, while the moving means for the donor guide roller has been described as a donor guide roller bracket with a coil spring, other types of springs and other devices may be used to pivot the bracket and bias the roller. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A thermal printer, comprising:

a printer frame;

a rotatable print drum mounted on said printer frame;

a print head pivotally connected to said printer frame for movement toward and from said drum;

a donor web passing between said drum and said print head, said print head pressing said donor web against said drum during printing;

a guide roller; and a guide roller frame pivotally connected to said frame and pivotally movable independently of said print head toward and from said print drum, said guide roller frame supporting said guide roller and moving said guide roller toward said print drum to contact said donor web to urge said donor web toward said print drum to prevent lifting of said thermal head from said print drum by said donor web during printing.

2. A thermal printer, comprising:

a printer frame;

a rotatable print drum mounted on said printer frame;

a print head pivotally connected to said printer frame for movement toward and from said drum;

a donor web traversing a path in said printer between said drum and said print head to thereby be pressed against said drum by said print head during printing;

a guide roller; and a guide roller frame pivotally connected to said printer frame and supporting said guide roller, said guide roller frame moving independently of said print head toward said print drum during printing to move said guide roller into contact with said donor web to urge said donor web toward said drum and away from said print head to thereby minimize any vertical force component exerted by said web tending to lift said print head away from said drum during printing.

* * * * *